United States Patent
Hissel et al.

(10) Patent No.: US 9,515,593 B2
(45) Date of Patent: Dec. 6, 2016

(54) REGULATION METHOD (71) Applicant: ALSTOM Technology Ltd, Baden (CH)

(72) Inventors: Anne-Marie Hissel, Belfort (FR); Philippe De Larminat, Nantes (FR)

(73) Assignee: General Electric Technology GmbH, Baden (CH)

( * ) Notice: Subject to any disclaimer, the term of this patent is extended or adjusted under 35 U.S.C. 154(b) by 360 days.

(21) Appl. No.: 14/159,137

(22) Filed: Jan. 20, 2014

(65) Prior Publication Data

US 2014/0132227 A1   May 15, 2014

Related U.S. Application Data

(63) Continuation of application No. PCT/EP2012/064283, filed on Jul. 20, 2012.

(30) Foreign Application Priority Data

Jul. 20, 2011 (EP) .................................... 11290331

(51) Int. Cl.
*H02P 9/02* (2006.01)
*G05B 13/04* (2006.01)
*G05B 17/02* (2006.01)

(52) U.S. Cl.
CPC .............. *H02P 9/02* (2013.01); *G05B 13/042* (2013.01); *G05B 13/048* (2013.01); *G05B 17/02* (2013.01)

(58) Field of Classification Search
CPC ........................................................ H02P 9/02
(Continued)

(56) References Cited

U.S. PATENT DOCUMENTS 5,374,011 A    12/1994 Lazarus et al.
5,606,248 A *   2/1997 Bourles .................. H02P 9/105
                                                    323/273

(Continued)

FOREIGN PATENT DOCUMENTS

EP     0 389 281       9/1990
RU    2296356 C1       3/2007

(Continued)

*Primary Examiner* — David S Luo
(74) *Attorney, Agent, or Firm* — John A. Kramer; Global Patent Operation (57) ABSTRACT

The invention relates to a method for automatic regulation of a system in which a plurality of parameters characteristic of the system are measured and in which at least one control parameter (u) is applied as a function of the measured parameters (y). The method includes choosing a nominal operating point of the system, and defining a nominal model (Mn) of the system at this nominal operating point. The method further includes determining a set of representative models ([Mk]) of the possible variations relative to the nominal model (Mn) and parameterizing the error of the nominal model (Mn) of the system by decomposition ($[\delta_{ik}]$) over all the errors between the models of the set of models ([Mk]) representative of the possible variations and the nominal model (Mn). The method also includes minimizing a given optimization criterion (J) by varying at least one of the previously obtained parameters ($[\delta_{ik}]$) of the error ($\Delta$) relative to the nominal model (M) of the system. The invention also relates to the regulation device configured for applying the method.

12 Claims, 4 Drawing Sheets

(58) Field of Classification Search
USPC .......................................... 318/149, 34, 558
See application file for complete search history.

(56) References Cited

U.S. PATENT DOCUMENTS

| | | | | |
|---|---|---|---|---|
| 6,153,998 | A * | 11/2000 | Takakura | G05B 21/02 |
| | | | | 318/560 |
| 7,382,105 | B2 * | 6/2008 | Endo | B62D 5/046 |
| | | | | 318/430 |
| 2004/0167657 | A1 | 8/2004 | Sasaki | |
| 2006/0075981 | A1 | 4/2006 | Iwase et al. | |
| 2009/0198350 | A1 | 8/2009 | Thiele | |

FOREIGN PATENT DOCUMENTS

| | | |
|---|---|---|
| RU | 2306590 C1 | 9/2007 |
| SU | 1575152 A1 | 6/1990 |
| WO | 01/40806 | 6/2001 |

\* cited by examiner

REGULATION METHOD

CROSS-REFERENCE TO RELATED APPLICATIONS

This application claims priority to PCT/EP2012/064283 filed Jul. 20, 2012, which in turn claims priority to European application 11290331.5 filed Jul. 20, 2011, the contents of which are both hereby incorporated in the entireties.

TECHNICAL FIELD

The invention concerns a method for regulation of an automatic system, applicable in particular to a device for regulation of the stator voltage of an alternating current generator.

BACKGROUND

Alternating current generators, in particular of high power (several hundred megawatts (MW)), are connected to electricity distribution networks the demand of which varies greatly.

These generators are subjected to varied disturbances of very different kind and magnitude: short circuits, voltage drops, load variation, load shedding, etc. In all cases, and throughout their operating range, performance as close as possible to the optimum is expected. Closed loops must also have sufficient stability margins.

The regulation methods used at present, in particular for high-power alternators in nuclear power stations, are based on the so-called four-loop regulator principle, the feedback (FBK) loops of which are used to maintain the output values as close as possible to a reference value, notably by controlling a certain number of controllable parameters.

These methods based on analogue technologies are highly sensitive to measurement errors and are even relatively ineffective in assuring the stability of closed loops over a wide range. In particular, these closed loop methods generate oscillations that are difficult to damp out and often poorly damped.

These regulation methods and the regulators applying them more particularly fail to meet the technical specifications of electricity suppliers relating to exciter and voltage adjustment equipment of high-power alternators in nuclear power stations over the whole of the range of use.

SUMMARY

In order at least partially to alleviate the shortcomings previously referred to, the invention consists in a method for automatic regulation of a system in which a plurality of parameters characteristic of the system are measured and in which at least one control parameter is applied as a function of the measured parameters,
characterized in that:
  a nominal operating point of the system is chosen,
  a nominal model describing the system at this nominal operating point is determined,
  a set of models representative of possible variations relative to the nominal model is determined,
  the error of the nominal model of the system is parameterized by decomposition over all the errors between the models of the set of models representative of the possible variations and the nominal model,
  a given optimization criterion is minimized by varying at least one of the previously obtained parameters of the error relative to the nominal model.

The optimization method thus obtained is desensitized in that the existence of the set of models representative of the parametric disruptions makes it possible to move away from the nominal operating point.

The method may also have one or more of the following features, separately or in combination.

The method further includes a supplementary step of optimization of the command with the error for the fixed nominal model by determination of at least one feedback gain.

The steps of minimization of the optimization criterion by varying the parameters of the error relative to the nominal model of the system and optimization of the command with the error relative to the fixed nominal model by determination of at least one feedback gain are repeated successively in an iterative loop.

The nominal model is an approximation of the ideal transfer function of the system.

The nominal model is the linearization of the ideal transfer function of the system around an operating point.

Said at least one control parameter of the system applied as a function of the errors determined to reduce the error between the estimated characteristic parameters and the measured characteristic parameters is determined by applying optimum feedback to an augmented system derived from the initial system by adding the integral to a measurable predetermined parameter.

The control parameter of the system that is applied is determined by optimization of an integral criterion.

The control parameter of the system that is applied is determined by the Linear Quadratic Gaussian (LQG) optimum control method.

The method further includes the following steps:
  estimated characteristic output parameters corresponding to measurable characteristic parameters are determined from said nominal model,
  the errors between at least one of the measured characteristic output parameters and at least one corresponding of the estimated characteristic output parameters are determined, and
  at least one control parameter of the system is applied as a function of the error determined to reduce the error between at least one of the estimated characteristic parameters and the corresponding at least one measured value of the measured characteristic output parameters.

The method includes a supplementary step of integration of the difference between the command and its saturated value, and the optimization of the command with error to the nominal model fixed by determination of at least one retroaction gain is made by using the integral of the difference between the command and its saturated value.

The system includes an electrical power station alternator connected to an electrical network and its exciter.

The state of the system is represented by a state vector that includes the stator voltage, the rotation speed of the rotor, the total angle and an image of the flux in the exciter.

The set of output magnitudes includes the stator voltage, the rotation speed of the rotor, the active power and an approximate value of the mechanical power modeling a main disturbance.

Said at least one control parameter that is applied includes an approximate value of the mechanical power modeling the main disturbance and the exciter control voltage.

Another object of the invention is a system for automatic regulation of a system in which a plurality of parameters characteristic of the system are measured and in which at least one control parameter is applied as a function of the measured parameters, characterized in that it includes means configured:
- to choose a nominal operating point of the system,
- to determine a nominal model describing the system at this nominal operating point,
- to determine a set of models representative of possible variations relative to the nominal model,
- to parameterize the error of the nominal model of the system by decomposition over all the errors between the models of the set of models representative of the possible variations and the nominal model,
- to minimize a given optimization criterion by varying at least one of the previously obtained parameters of the error relative to the nominal model of the system.

BRIEF DESCRIPTION OF THE DRAWINGS

Other features and advantages will become apparent on reading the description of the following figures, in which.

DETAILED DESCRIPTION

The same references relate to the same elements in all the figures.

Figure 1:
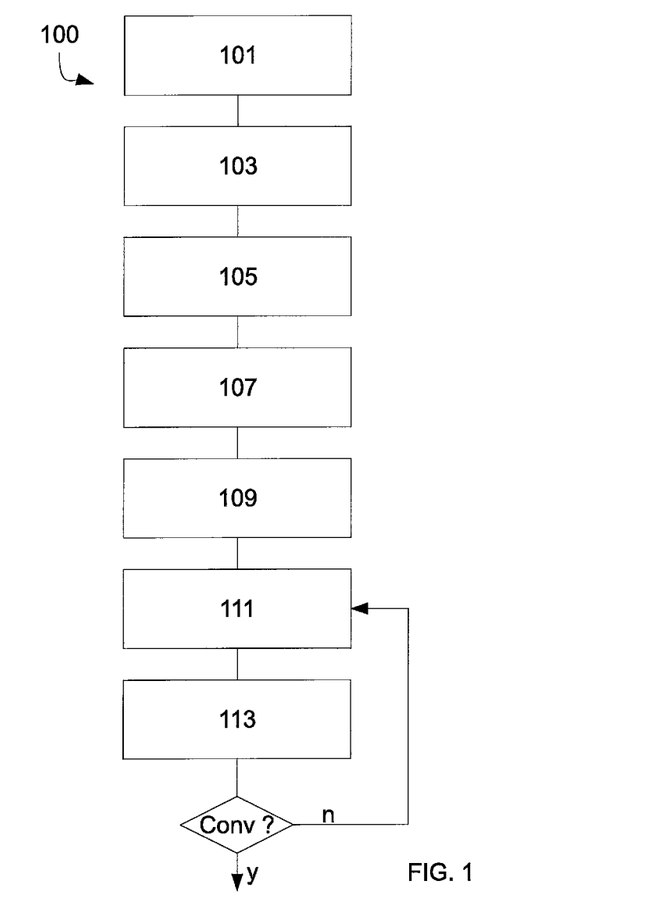
FIG. 1 is a diagram representing in flow chart form the steps of one embodiment of the method.

The invention concerns a method for automatic regulation of a system. FIG. 1 shows various steps of the method 100 for regulation of the system. The method is used in particular in the case of an alternator coupled to an electrical network. The objective is to apply the exciter voltage to the alternator in such a way as to assure the stability of the alternator whilst tracking a setpoint voltage. This setpoint voltage is established so as to track the demand of the network to which the alternator is connected.

The alternator is of the turbo-alternator type, for example. It comprises a rotor driven by a turbine connected to the reactor and a stator. The stator is at a certain so-called stator voltage Vs.

The first step 101 of the method 100 is the selection of a nominal model Mn, which can notably be the simplest, linear and invariant design model. This nominal model may in particular represent the linearization of the transfer function at a predetermined operating point, deemed to be that at which the system is deemed to be operating.

The method is modeled around the operating point by the following set of equations:

$$\begin{cases} \dot{x} = Am \cdot x + Bm \cdot u_m \\ y = Cm \cdot x + Dm \cdot u_m \end{cases}$$

In the above equations:
- x is a state vector, and in the case of the alternator $x=[Vs\ \omega\ \theta\ efd]^T$ where Vs is the stator voltage, $\omega$ the rotation speed, $\theta$ the total angle between the voltage of the network and the electromotive force, and efd is an image of the magnetic flux in the exciter,
- $u_m$ is an input vector, and in the case of the alternator $u_m=[u\ Pmec]^T$ where u is a control parameter and Pmec is a mechanical power communicated to the rotor, treated as the main disturbance,
- y is the output vector, and in the case of the alternator $y=[Vs\ \omega\ Pe\ Pmec]^T$ where Pe is the active electrical power supplied.

Here the notation $[\ldots]^T$ designates the transposition operation, the vectors being used in the form of vertical vectors in the formulas.

A model is thus characterized by four matrices Am, Bm, Cm, Dm.

The values of the various parameters are chosen to model the system optimally about a given operating point. That operating point is in general that around which the designer wishes to confer stability properties on the system to be regulated. For example, in the case of the alternating current generator this is a normal operating point.

Am, Bm, Cm and Dm are matrices chosen to be invariant in the context of an invariant linear model. This invariant linear model produces a first approximation that is easy to manipulate and models the system around the operating point in a larger or smaller vicinity, depending on the required tolerance. This model is generally the first order linear approximation of the transfer function describing the real evolution of the system.

It is possible to have time or other variable parameters contribute explicitly to the values of the matrices Am, Bm, Cm and Dm. In this case the calculations must take into account the values of the derivatives of these matrices. This quickly complicates the calculations, depending on the form of time dependency, but the method as a whole remains unchanged.

Figure 2:
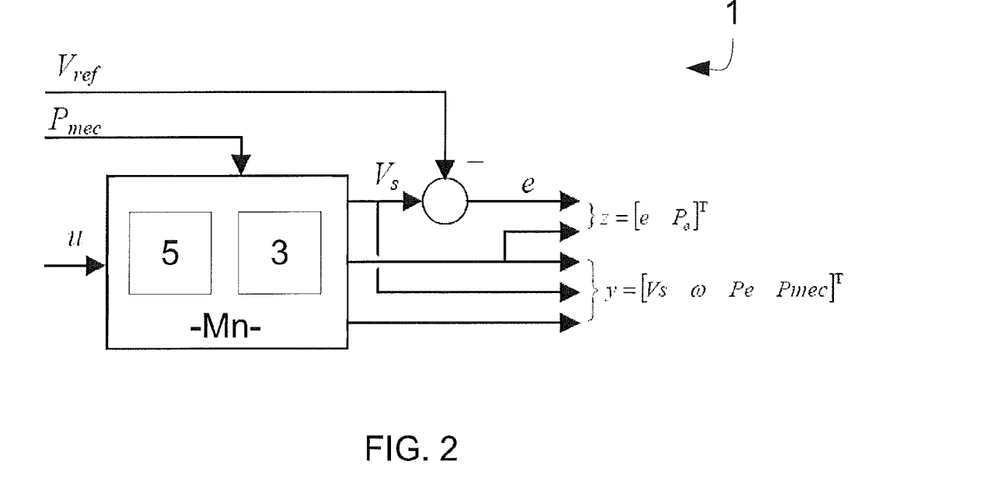
FIG. 2 is a block diagram representing one embodiment of the so-called nominal model of the system.

FIG. 2 represents in functional block diagram form the system modeled in this way.

The central element of this functional block diagram 1 is the nominal model Mn, which comprises the alternator 3 and the exciter 5. The nominal model Mn receives as input the setpoint value $V_{ref}$, the control parameter u and the main disturbance Pmec.

As output, the nominal model Mn supplies the set of physical output magnitudes that includes the stator voltage Vs, from which the setpoint value $V_{ref}$ is subtracted in order to obtain the error e with respect to the setpoint, the electrical power Pe, and the vector $y=[Vs\ \omega\ Pe\ Pmec]^T$.

The values of e and Pe are grouped in a vector $z=[e\ Pe]^T$.

The disturbances are for the most part of known kind and inherent to the physical implementation of the electrical power stations and networks, and in particular inherent to the fact that electrical power stations generally employ a certain number of alternators in parallel connected to a variable number of lines and consumers.

A certain number of pertinent disturbances may be distinguished, including:
- three-phase short-circuit: the voltage in the network falls sharply to zero over a short time period, with the result that the only reactance perceived is that of the transformer, after which the reactance of the line is re-established,
- voltage dip: similar to a short-circuit, but for an intermediate network voltage drop value, load shedding, the consequence of a prolonged short-circuit or voltage dip: the alternator is disconnected from all or part of the network; in the extreme case it no longer supplies power except to its auxiliaries to maintain its own operation, loss of an adjacent set: in the context of a plurality of alternators in parallel, the failure or stopping of an adjacent alternator (set) can lead to under-exciter of the alternator concerned, loss of at least one adjacent set at low voltage, leading to operation at the overexcitation limit: following the stopping of one or more adjacent sets, the alternator concerned switches to current limitation mode, and frequency drop, caused by the loss of a mechanical power production site, which is reflected in a frequency drop of the order of a few hundred mHz in a period of a few seconds.

The above disturbances are representative of those encountered in a real network, and it must be possible to eliminate them in the time scales set out in the technical specifications.

In step 103 in FIG. 1, the nominal model is augmented by predictor models chosen to null for the setpoint and the main disturbance Pmec. The set of equations representing it is then as follows:

$$\begin{cases} \dot{\xi}_1 = A_{11} \cdot \xi_1 + B_1 \cdot (u - u_a) \\ \dot{\xi}_2 = A_{22} \cdot \xi_2 \\ y = Cy_1 \cdot \xi_1 + Dy \cdot (u - u_a) \\ z = \begin{bmatrix} Vs - Vref \\ Pe \end{bmatrix} = Ce_1 \cdot \xi_1 + De \cdot (u - u_a) \end{cases} \text{where} \begin{cases} \xi_1 = x_1 + Ta \cdot x_2 \\ \xi_2 = x_2 \end{cases}$$

with $A_{11}=Am$, $A_{22}=0$, $B_1=Bm_1$, $Cy_1=Cm$, $De=Dy=0$ and the vectors $x_1=x$, $x_2=[Vref\ Pmec]^T$ and $u_a=-Ga \cdot x2$ $Bm_1$ being the higher sub-matrix of Bm of appropriate size and Ga being a gain determined by solving the known Problem of Regulation with Internal Stability (PRIS), from which the form of the above equations stems. However, this gain may be obtained by other known regulator feedback methods.

The augmented model is then used in the step 105 of FIG. 1 to reconstruct the state of the process. State reconstruction is usually based on an estimator such as a Kalman filter. Here, on the other hand, it is on the basis of the model used and the magnitudes measured that the state is reconstructed. The method thus uses the nominal model, here the design model, to establish estimated parameters that will serve as references. This function of the method is therefore referred to as feedforward (FFD) predictive action for the predictor aspect that it embodies through supplying reference magnitudes, as opposed to classic feedback.

Thanks to FFD, state estimators are dispensed with. Moreover, having placed all the non-measurable magnitudes in said state vector, no further calculations are effected on them.

In the step 107 of FIG. 1 optimum feedback is applied in order to deduce reference control parameters enabling optimum tracking of the setpoint to be obtained in the context of the nominal model. The linear feedback is effected notably by optimization of an integral criterion, which in the case of the alternating current generator may be:

$$J = \int_0^\infty [e^T \cdot Sr \cdot e + (u - u_a)^T \cdot Rr \cdot (u - u_a)] \cdot dt$$

where Sr and Rr are positive weighting matrices.

It is more particularly possible to apply a method such as the Linear Quadratic Gaussian (LQG) control method to effect this optimum feedback.

Figure 3:
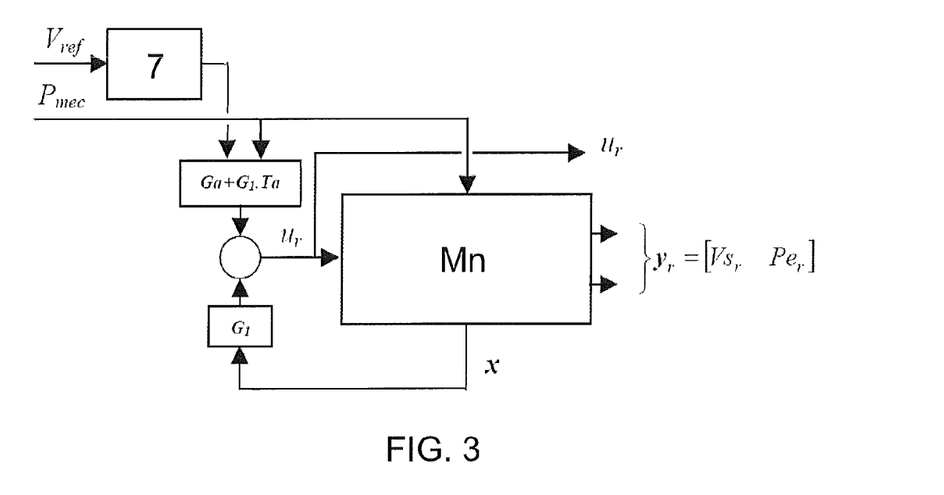
FIG. 3 is a block diagram representing one embodiment of the so-called "feedforward" predictive function.

FIG. 3 shows in block diagram form the system with one embodiment of the FFD prediction loop.

The central element of the FIG. 3 block diagram is the nominal model Mn.

As input are received the mechanical power Pmec and the setpoint voltage Vref. The setpoint voltage Vref is filtered by a first order filter 7 with a known time constant Tref and thus with the transfer function $(1+sTref)^{-1}$.

The reference command $u_r$ is determined from the filtered setpoint voltage, the mechanical power Pmec and the state x of the system. This reference command $u_r$ is supplied to the block Mn, which supplies as output the reference output vector $y_r$. The reference or estimated output vector includes in the case of the alternator a reference stator voltage $Vs_r$ and a reference electrical power $Pe_r$.

On exit from the prediction loop there is obtained the set of estimated reference magnitudes, composed of the reference command $u_r$ and the reference output vector $y_r$.

It can be seen in said FIG. 3 that the optimum feedback used to obtain the reference command is of the form [G1; Ga+G1.Ta]. The gain G1 is obtained by optimization of the integral criterion on the basis of a command horizon Tr employing one of the usual methods. Ga and Ta are those obtained on classic solution of the PRIS problem, Ta being the integration horizon for the determination of Ga. The total gain of the optimum feedback used is the sum of these two terms.

Figure 4:
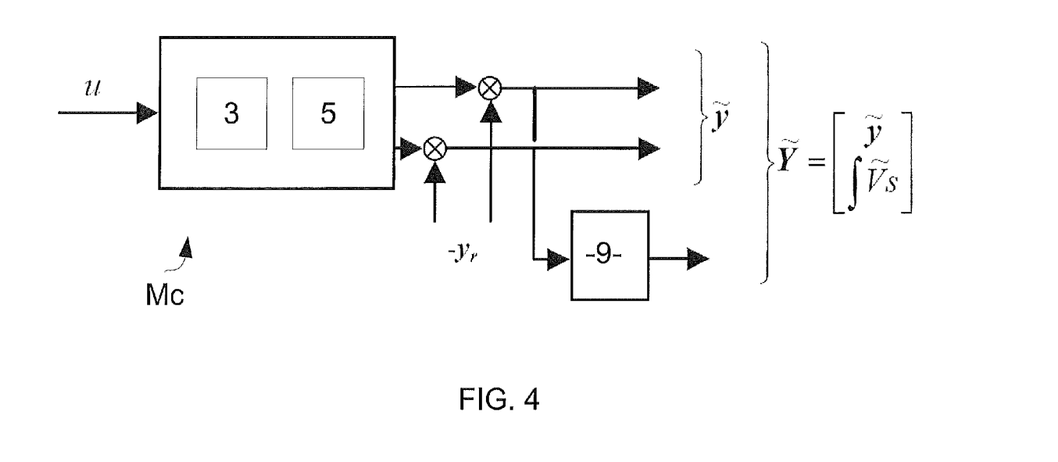
FIG. 4 is a block diagram representing one embodiment of the so-called design model of the feedback system.

At least one of the parameters of the estimated reference magnitudes $u_r$ and $y_r$ is then used in feedback (FBK) to determine an error relative to the nominal model. To this end, the errors between at least one of the measured characteristic output parameters y and at least one of the estimated characteristic output parameters $y_r$ are determined and at least one command parameter u of the system is applied or modified as a function of the errors determined to reduce the error between the estimated characteristic parameters $y_r$ and the measured values of the measurable characteristic parameters y. To effect this feedback FBK a so-called design model Mc shown in FIG. 4 is defined first.

The central block of this diagram is the block combining the alternator 3 and the exciter 5, this time in their real form. This block receives as input the real command u and supplies as output the output magnitude vector y, from which the reference output vector $y_r$ is subtracted to obtain a vector $\tilde{y}=[Vs-Vs_r\ Pe-Pe_r]$ of the errors in the output relative to the reference. This vector $\tilde{y}$ is augmented to produce a vector $\tilde{Y}$ by addition of the integral value of $Vs-Vs_r$, by sampling $Vs-Vs_r$ and passage through an integrator 9.

The standard model associated with the augmented process takes the form:

$$\begin{cases} \begin{bmatrix} \dot{x} \\ \frac{d}{dt}\int Vs \end{bmatrix} = \begin{bmatrix} Am & 0 \\ E \cdot Cm & 0 \end{bmatrix} \cdot \begin{bmatrix} x \\ \int Vs \end{bmatrix} + \begin{bmatrix} Bm_1 \\ 0 \end{bmatrix} \cdot u \\ Y = \begin{bmatrix} y \\ \int Vs \end{bmatrix} = \begin{bmatrix} Cm & 0 \\ 0 & 1 \end{bmatrix} \cdot \begin{bmatrix} x \\ \int Vs \end{bmatrix} + \begin{bmatrix} Dm_1 \\ 0 \end{bmatrix} \cdot u \end{cases}$$

in which E is a matrix enabling selection of the output parameter on which an integral action is to be introduced.

Finally, the design model is chosen at an operating point of the process that can be the same as that for the FFD.

The problem of optimization of the design system at the operating point is then solved.

The solution may employ a known dual LQG/LTR control type regulator.

The regulator then has two distinct functions: a function of reconstruction of the augmented state of the integral of the output voltage, and optimum linear feedback to the reconstructed augmented state.

The invention makes provision for further improvement of the robustness of the command supplied by desensitization. To this end, the method is modeled around the nominal operating point chosen as follows:

$$\begin{cases} \dot{x} = A_N \cdot x + B_N \cdot u + \begin{bmatrix} Q_0^{\frac{1}{2}} & 0 \end{bmatrix} \cdot w \\ y = C_N \cdot x + D_N \cdot u + \begin{bmatrix} 0 & R_0^{\frac{1}{2}} \end{bmatrix} \cdot w \end{cases}$$

where w is Gaussian white noise retranscribing the state and measurement noise.

The nominal model is completed in the step 109 in FIG. 1 with a set of K models $\{M_i\}$ selected to be representative of the possible variations of the state of the system. Rigorously selected, these models form a variations "base".

The error between any model from the set $M_k$ and the nominal model $M_N$ is then parameterized by the projection of the difference $M-M_N$ onto the errors between the models of the set $\{M_i\}$ and the nominal model $M_N$:

$$M_k - M_N = \Sigma \delta_{ik}(M_i - M_N)$$

where $\delta_{ik}$ varying from 0 to 1 is a normalized parameter.

The production of the parameters $\delta$ can then be defined, as follows:

$$\Delta = [\delta_{ik}]_{i=1,\ldots,m;\, k=1,\ldots,K}$$

Figure 5:
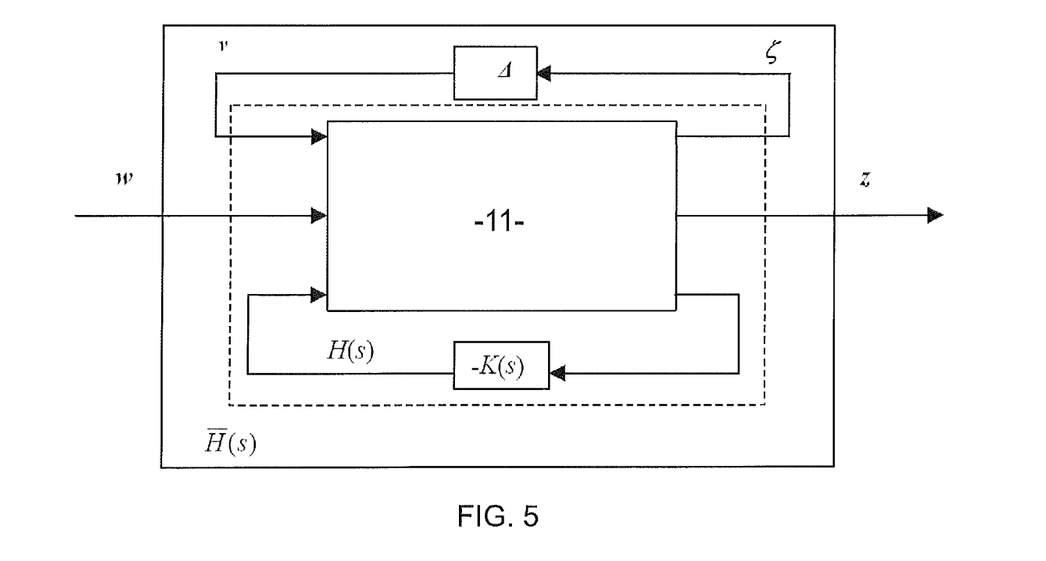
FIG. 5 is a block diagram representing the augmented system used for desensitization according to the invention.

In particular, the number of parameters $\delta_i$ is limited to the number m of underlying real parameters. The following set of equations can then be obtained to describe the evolution of the system:

$$\begin{cases} \dot{x} = A_N \cdot x + B_N \cdot u + \begin{bmatrix} Q_0^{\frac{1}{2}} & 0 \end{bmatrix} \cdot w + \begin{bmatrix} \Phi_{A_1} & \Phi_{B_1} & \cdots & \Phi_{A_m} & \Phi_{B_m} \end{bmatrix} \cdot v \\ y = C_N \cdot x + D_N \cdot u + \begin{bmatrix} 0 & R_0^{\frac{1}{2}} \end{bmatrix} \cdot w + \begin{bmatrix} \Phi_{C_1} & \Phi_{D_1} & \cdots & \Phi_{C_m} & \Phi_{D_m} \end{bmatrix} \cdot v \end{cases}$$

where $$\Phi_{A_1} = A_1 - A_N, \ldots, \Phi_{B_1} = B_1 - B_N,$$

$$\ldots, \Phi_{C_1} = C_1 - C_N, \ldots, \Phi_{D_1} = D_1 - D_N,$$

$$v = \Delta \cdot \zeta, \zeta = \begin{bmatrix} I \\ 0 \\ M \\ I \\ 0 \end{bmatrix} \cdot x + \begin{bmatrix} 0 \\ I \\ M \\ 0 \\ I \end{bmatrix} \cdot u,$$

and where $\Delta = \begin{bmatrix} \delta_1 \cdot I & & 0 \\ & \ldots & \\ 0 & & \delta_m \cdot I \end{bmatrix}$ The evolution of the system is then characterized by a set of equations represented in block diagram form in FIG. 5.

In that figure, the central block 11 represents the standard system, characterized by Am, Bm, Cm, Dm, $Q_0$, $R_0$ and the set of models $\{M_k\}$.

The uncertainties are transferred into an exterior loop of gain $\Delta$.

The optimum command at fixed A is determined by way of the loop of gain $-K(s)$.

Two systems are then defined. The first system H(s) encompasses the standard system 11 and the loop of gain $-K(s)$. The second H(s) comprises the system H(s) and the loop of gain $\Delta$.

The system H(s) receives as input w and v, and supplies as output $\zeta$ and z. $\zeta$ is sent to the loop of gain $\Delta$ to obtain v (see above equations).

Then, by defining $H_{\zeta v}$, $H_{\zeta w}$, $H_{zv}$, and $H_{zw}$, the dependent submatrices of K(s) of the transfer function H(s):

$$\begin{bmatrix} \zeta \\ z \end{bmatrix} = \begin{bmatrix} H_{\zeta v} & H_{\zeta w} \\ H_{zv} & H_{zw} \end{bmatrix} \begin{bmatrix} v \\ w \end{bmatrix}$$

This is translated on the complete system H(s) as:

$$H = H_{zw} + H_{zv} \Delta^{1/2} (I - \Delta^{1/2} H_{\zeta v} \Delta^{1/2})^{-1} \Delta^{1/2} H_{\zeta 2}$$

Assuming that $\|\Delta\| < \sigma$, where $\sigma$ is an arbitrarily small adjustment parameter and $\|.\|$ is a norm (the norm is 2 or infinite for example), the transfer function H may be developed as a Taylor series.

Figure 6:
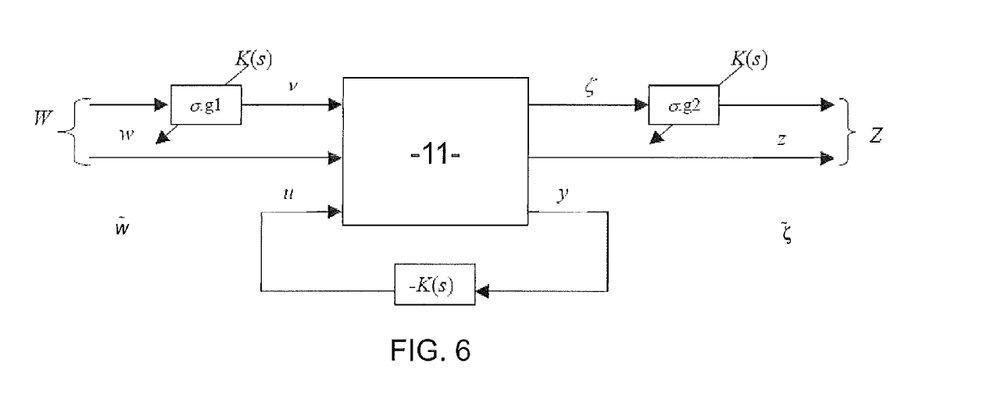
FIG. 6 is a block diagram representing a simplified second version of the augmented system from FIG. 5.

Then $H \approx H_{zw} + H_{zv} \Delta H_{\zeta w} + H_{zv} \Delta H_{\zeta v} \Delta H_{\zeta w}$ The process to be optimized, represented in block diagram form in FIG. 6, is constructed by introducing the reconstructed vectors $\tilde{w}$ and $\tilde{\zeta}$, in this particular case using the FFD predictor described above. It is also possible to use a reconstructed state obtained by another method, for example by means of a Kalman estimator.

This augmented system receives as input w and $\tilde{w}$, combined in a vector W, separately on two parallel lines. $\tilde{w}$ is multiplied by $\sigma H_{\zeta w}$. To obtain v. w and v are fed to the central block which represents the system 11. At the exit from the system-block 11 there are found $\zeta$ and z. $\zeta$ is multiplied by $\sigma H_{zv}$ to obtain $\tilde{\zeta}$, grouped with z in a single output vector Z.

The augmented system also includes the feedback loop of gain $-K(s)$ that connects the output y to the input u of the system-block 11.

Starting with the non-desensitized regulator, in which the gain of the feedback loop has the value $K_0$, the optimization of the system H then follows applied to $\Delta$ with fixed K(s) having the value $K_0$. There is thus obtained a new system 11 to be optimized in terms of K(s) to determine a new gain $K_1$ of this loop. With this new gain $K_1$ a new system 11 is established by optimization applying to $\Delta$. These latter steps are then repeated. $\delta_{ik}$ are supplementary adjustment parameters. They can thus be only partly adjusted during the optimization steps. The choice of the $\delta_{ik}$ that will be modified will essentially depend on the form of the models chosen.

$H_{\zeta w}$ and $H_{zv}$ depend on the value of K(s), and so on each iteration the dimension of K(s) increases. To prevent this it is possible, with a second approximation, to replace $H_{\zeta w}$ and $H_{zv}$ with static gains $g_1$, $g_2$, by weighting $\|H\|$ using $\sigma$.

There is thus obtained an iterative loop which can be repeated until a convergence condition is satisfied. In practice, five repetitions have prove sufficient in most cases, and thus a fixed number of repetitions supplies an acceptable result.

Figure 7:
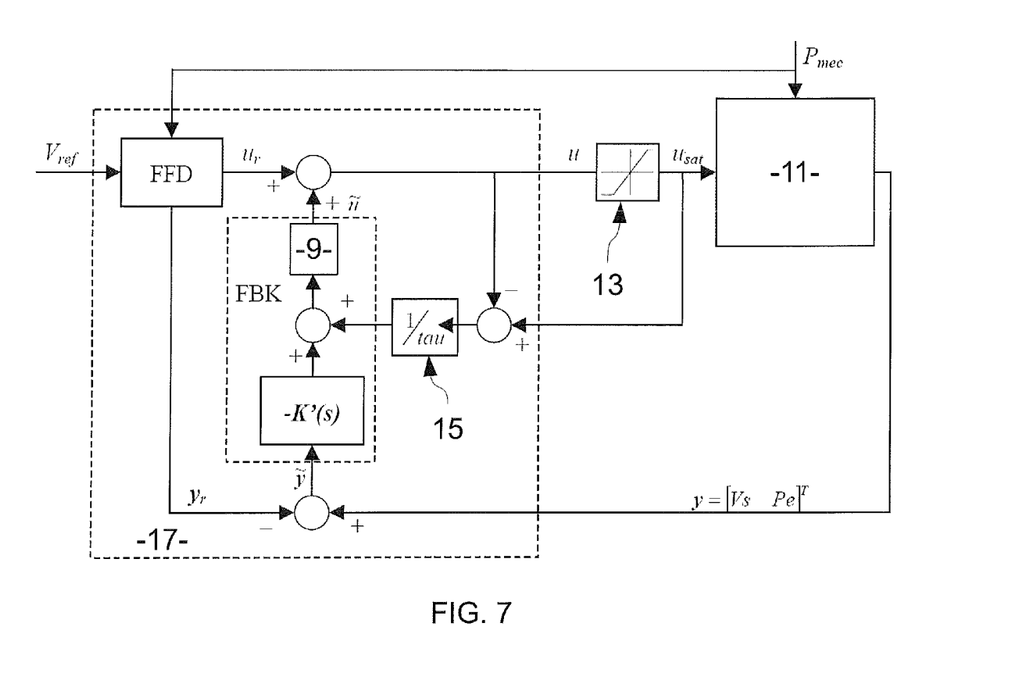
FIG. 7 is a functional block diagram representing an embodiment comprising the predictive function, feedback, desensitization and action on control saturation.

FIG. 7 shows in functional block diagram form one embodiment of a regulator of an alternator 3, exciter 5 system as described above, further comprising a desaturation function.

The real machine has only one bounded range of command u. The fact that the range is bounded is a result of the technical implementation of the system, and the value of the bound depends on the embodiment.

In FIG. 7, the diagram comprises said system 11 with desensitization function, the predictor block FFD, the feedback function FBK, and a supplementary block 13 taking account of the saturation of the command u.

The block FFD receives the main disturbance Pmec and the reference voltage $V_{ref}$ and supplies as output the reference magnitudes $u_r$, $y_r$.

The block FBK receives as input the difference between the output of the system block 11 and the reference output $y_r$, and with a feedback gain $-K'(s)$ enables the command precursor $\tilde{u}$ to be obtained, to which the reference command $u_r$ is added to obtain the command u, which after entering the supplementary saturation block 13 yields the saturated command $u_{sat}$ that is supplied to the system 11.

The command precursor $\tilde{u}$ is obtained using a desaturation integrator 15 of gain 1/tau which integrates the difference between the command u and the saturated command $u_{sat}$.

It should be noted in particular that the integrator 9 is placed in the block FBK, near its output, which corresponds to a change of variable relative to the FBK described above.

The resulting regulator has demonstrated in simulations beneficial results concerning the removal of the disturbances referred to above in the context of simulations bearing in particular on the Flamanville EPR (European Pressurized water Reactor).

In the case of short circuits in particular, power is re-established in less than 10 seconds, whilst enabling the total angle to be maintained (which assures stability) with the regulator alone over a wide range of operating points.

In the case of voltage dips the voltage at the terminals of the transformer connected to the alternator remains within the limits imposed by EDF in all of the cases examined.

In the case of load shedding, the voltage returns to within less than 1% unitary of the final values in less than 10 seconds.

In the case of a frequency drop, the return to within 1% unitary of the normal value takes less than 8 seconds, without the voltage error with respect to the setpoint exceeding 4% unitary.

The return times, in particular to within 1% of the required value, confirm the fast and effective elimination of oscillations.

The method thus enables reduction of the disturbances to the state of the system. By moving the real state towards the ideal state, the method assures system stability that then depends only on the accuracy of the model used and the precision of the measurements.

The invention claimed is:

1. A method for automatic regulation of a system in which a plurality of parameters characteristic of the system are measured and in which at least one control parameter (u) is applied as a function of the measured parameters (y), the method comprising:
choosing a nominal operating point of the system;
determining a nominal model (Mn) describing the system at this nominal operating point;
determining a set of representative models ([Mk]) of the possible variations relative to the nominal model (Mn);
parametering the error of the nominal model (Mn) of the system by decomposition ([δik]) over all the errors between the models of the set of models ([Mk]) representative of the possible variations and the nominal model (Mn);
minimizing a given optimization criterion (J) by varying at least one of the previously obtained parameters ([δik]) of the error (Δ) relative to the nominal model (M) of the system; and
optimizing the command (u) with error (Δ) relative to the nominal model (Mn) fixed by determination of at least one feedback gain (−K(s)).

2. The method claimed in claim 1, further comprising fixing the minimization of the optimization criterion (J) by varying the parameters of the error (Δ) relative to the nominal model (Mn) of the system and optimization of the command (u) with error (Δ) relative to the nominal model (Mn) by determination of at least one feedback gain (−K(s)) are repeated successively in an iterative loop.

3. The method claimed in claim 1, wherein the nominal model (Mn) is an approximation (Am, Bm, Cm, Dm) of the ideal transfer function of the system.

4. The method claimed in claim 1, wherein the nominal model (Mn) is the linearization (Am, Bm, Cm, Dm) around an operating point of the ideal transfer function of the system.

5. The method claimed in claim 1, further comprising applying said at least one control parameter of the system as a function of the errors determined to reduce the error between the estimated characteristic output parameters (yr); and determining the measured output parameters (y) by applying optimum feedback to an augmented system derived from the initial system by adding the integral to at least one of the predetermined measured characteristic parameters.

6. The method claimed in claim 1, further comprising determining the control parameter of the system that is applied by optimization of an integral criterion.

7. The method claimed in claim 1, further comprising determining the control parameter of the system that is applied by the Linear Quadratic Gaussian (LQG) optimum control method.

8. The method claimed in claim 1, further comprising:
determining estimated characteristic parameters (ur, yr) corresponding to measurable characteristic parameters (u, y) from said nominal model,
determining the errors between at least one of the measured characteristic parameters (u, y) and at least one corresponding of the estimated characteristic parameters (ur, yr); and
applying at least one control parameter of the system as a function of the errors determined to reduce the error between at least one of the estimated characteristic output parameters (yr) and the corresponding at least one measured value of the measured characteristic output parameters (y).

9. The method claimed in claim 1, wherein the system includes an electrical power station alternator connected to an electrical network and its exciter.

10. A method for automatic regulation of a system in which a plurality of parameters characteristic of the system are measured and in which at least one control parameter (u) is applied as a function of the measured parameters (y), the method comprising:
choosing a nominal operating point of the system;
determining a nominal model (Mn) describing the system at this nominal operating point;

determining a set of representative models ([Mk]) of the possible variations relative to the nominal model (Mn);

parametering the error of the nominal model (Mn) of the system by decomposition ([δik]) over all the errors between the models of the set of models ([Mk]) representative of the possible variations and the nominal model (Mn);

minimizing a given optimization criterion (J) by varying at least one of the previously obtained parameters ([δik]) of the error (Δ) relative to the nominal model (M) of the system; and an electrical power station alternator connected to an electrical network and its exciter;

wherein the state of the system is represented by a state vector (x) that includes the stator voltage (Vs), the rotation speed (ω) of the rotor, the total angle (θ) and an image of the flow in the exciter (efd).

11. The method claimed in claim 10, wherein the set of output magnitudes includes the rotation speed (ω) of the rotor, the active power (Pe) and an approximate value of the mechanical power (Pmec) modeling a main disturbance.

12. The method claimed in claim 10, wherein said at least one control parameter that is applied includes an approximate value of the mechanical power modeling the main disturbance (Pmec) and the exciter control voltage.

* * * * *